July 1, 1930.  H. L. ALLEN  1,769,483
FOOTBALL PLAY INDICATOR
Filed Jan. 6, 1930
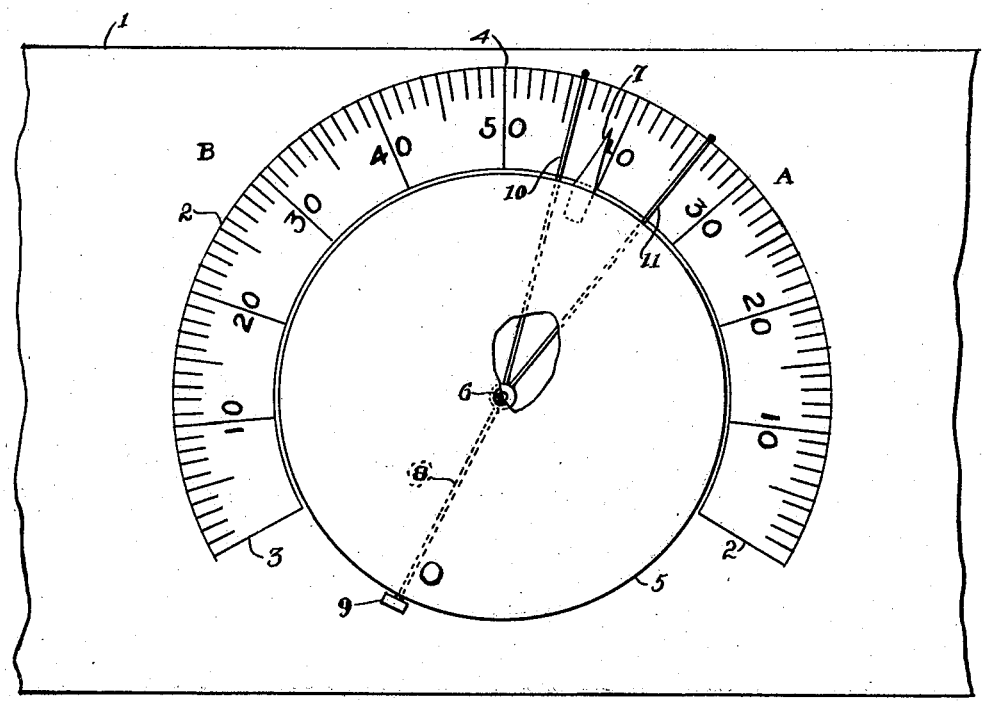
INVENTOR
Horace L. Allen
John A. Naismith
ATTORNEY Patented July 1, 1930

1,769,483

UNITED STATES PATENT OFFICE

HORACE L. ALLEN, OF SAN JOSE, CALIFORNIA

FOOTBALL PLAY INDICATOR

Application filed January 6, 1930. Serial No. 418,862.

It is the object of the present invention to provide a device whereby the listener-in to a raido presentation of a foot-ball game may quickly and accurately register the successive positions of the ball as announced, and also indicate the particular ten yard portion of the field over which the ball is being played.

It is also an object of the invention to provide a device of the character indicated that will be economical to manufacture, substantial in construction, simple in form, of few parts, quickly and easily manipulated, and highly efficient in its practical application.

In the drawing the figure is a plan view of a device embodying my invention, part broken away.

The device consists essentially of a card 1 having a circular scale 2 laid out thereon, the scale representing a football field and indicating the yards from the goals 2 and 3 to the fifty yard line in the center of the field 4.

At 5 is shown a disc lying within the scale 2 and pivoted at the center thereof as at 6, a pointer 7 being mounted on the disc to move over the scale as shown.

At 8 is shown an arm pivoted at 6 beneath the disc 5 and extending beyond the edge thereof where it is fitted with a finger-piece 9. This arm is forked as at 10 and 11 and extends outwardly over the scale, the spacing of the forked portions 10 and 11 being equal to ten yards as shown on the scale.

For the purpose of this description, that portion of the scale lying between goal 2 and center 4 is indicated by the reference character A, and that portion lying between goal 3 and center 4 is indicated by the character B.

Assuming the game to have been in progress for a time, the pointer 7 now indicates that the ball is on "A's" forty-first yard line, and as it moves back and forth over the field the pointer may be quickly moved to indicate each successive position, thereby enabling the listener to accurately follow the course of the ball throughout the entire game.

The position of the forked portions 10—11 indicates the specific ten yard portion of the field over which the side having the ball is to play. Immediately upon the announcement that the ball has passed to the opposite side the listener may shift the forked portion 10—11 to indicate the specific portion of the field over which that side is to play.

It may be readily seen from the foregoing that by means of this device a listener may at all times have an accurate visual record of the position of the ball and also of the specific ten yard portion of the field over which it is being played.

It is to be understood, of course, that while I have herein shown and described but one specific embodiment of the invention, changes in form, construction, and method of assembly and operation may be made within the scope of the appended claims.

I claim:

1. A device of the character described comprising, a scale graduated from both ends to the center to represent the yards of a football field, a pointer mounted to move over the scale to indicate a given point thereon, and a pair of spaced and relatively fixed elements mounted to move over the scale, the spacing of said elements being equal to ten yards as indicated on the scale.

2. A device of the character described comprising an annular scale graduated from both ends to the center to represent the yards on a football field, a pointer for the scale revolubly mounted at the center thereof, and a forked arm revolubly mounted at the center of the scale and in operative relation thereto, the spacing of the forked arm portions being equal to ten yards as indicated on the scale.

HORACE L. ALLEN.